(No Model.)  G. H. PERKINS.  5 Sheets—Sheet 2.
SOLDERING MACHINE.

No. 297,629. Patented Apr. 29, 1884.

Witnesses, Inventor,
John K. Kupertus George H. Perkins,
John Solleson By his Attorneys
 W. C. Strawbridge
 J. Bonsall Taylor.

FIG. 3.

(No Model.) 5 Sheets—Sheet 4.

G. H. PERKINS.
SOLDERING MACHINE.

No. 297,629. Patented Apr. 29, 1884.

Witnesses,
John K. Rupertus
John Tollison

Inventor,
George H. Perkins,
By his Attorneys,
W. C. Strawbridge
J. Bonsall Taylor

(No Model.) 5 Sheets—Sheet 5.

G. H. PERKINS.
SOLDERING MACHINE.

No. 297,629. Patented Apr. 29, 1884.

Witnesses,
John K. Rupertus
John Sollers

Inventor,
George H. Perkins,
By his Attorneys,
W. C. Strawbridge
Bonsall Taylor.

UNITED STATES PATENT OFFICE.

GEORGE H. PERKINS, OF PHILADELPHIA, PENNSYLVANIA.

SOLDERING-MACHINE.

SPECIFICATION forming part of Letters Patent No. 297,629, dated April 29, 1884.

Application filed March 23, 1883. (No model.)

*To all whom it may concern:*

Be it known that I, GEORGE H. PERKINS, of Philadelphia, Pennsylvania, have invented certain improvements in apparatus for automatically soldering the seams which unite the heads or tops and bottoms to the bodies of quadrangular, square, hexagonal, and other shaped sheet-metal cans having angular or approximately angular corners, of which the following is a specification.

My present invention embraces an apparatus for carrying out upon an extensive scale a method of automatically soldering the seams of cans invented by me, and constituting the subject-matter of United States Letters Patent No. 288,363, granted to me November 13, 1883, upon an application executed January 20, 1883, and filed February 1, 1883. Reference to the foregoing Letters Patent will render more easy a comprehension of my present improvements.

In order to enable an accurate comprehension of my present apparatus, I regard it as necessary to recite that my invention in methods of soldering referred to makes use of a machine in which a suitable frame-work contains all the operative parts, and supports both a solder pot or bath and a furnace for retaining in a molten condition the solder in the pot, and that the operative parts, or those which effect the manipulation of the can and the immersion of its head-seams after its introduction into the holder of the machine, are, first, a revoluble can-holder larger than the can and conformed to the horizontal sectional outline of the can, into which the can is loosely inserted or dropped; second, a vertically reciprocating or sliding head, to which the revoluble can-holder is connected, and by which it is lifted and dropped, so as to lift the seam of the can from out of and submerge it in the bath; third, a disk-cam, the periphery of which is suitably conformed to lift and drop the sliding head at the proper times after the proper intervals and to the required extent; fourth, devices connected with the disk-cam which at predetermined intervals occasion predetermined rotations of the can-holder during periods when it is elevated by the lift of its sliding head; fifth, means for locking or tightly holding the can-holder in the various positions of rotation which it is caused to assume; and, sixth, mechanism for occasioning predetermined movements in the disk-cam.

I also regard it as necessary here to recite that the essential characteristics of the machine above outlined are, that it enables the dipping of the several sides of the head-seams of an angular can in rapid successive order; that it further enables the withdrawal of each side of the seam in turn (after being dipped) from out the solder bath at an angle with respect to the plane of the surface of said bath, so that one end or corner bounding said side of the seam so dipped is lifted from the solder before the other corner of said side, and the side itself of the seam so dipped, considered as an entirety, is, as stated, taken out from the bath in an angular position, and in such a position that said seam is permitted to drain from the corner first toward the corner last taken out; that it enables, moreover, the continuous drainage of the side of the seam last dipped, on which the solder is still hot and in consistency to drain, during the time when the side of the seam next in order is being dipped, by placing the seam last dipped in a perpendicular plane; that it enables, again, the lifting of that side of the head-seam which is dipped last from out the solder bath in an angularly opposite position from that in which the side of said seam immediately preceding it stood when said side was lifted, in order that the last side of the seam may drain in an opposite direction from that in which the side immediately preceding it drained, or toward that corner of the head-seam of the can which is intermediate between the last and the next to the last side of said seam dipped; that it enables the subsequent dipping of said intermediate corner, so as to insure the drainage of even the last drop from off said corner and seam; and that it enables, finally, the ready insertion and removal of the can by reason of the holders being made larger than the can.

All of the above operations in the above-recited form of apparatus are in a measure due to the fact that the can-holder, although of the same outline, is somewhat larger than the exterior of the can.

Bearing in mind the construction of the machine above briefly and in general terms mentioned, it is proper to state that my present apparatus enables the practicing of precisely the method of the successive dipping of the sides of the head-seams and their withdrawal from the solder bath in an angular position, and the subsequent dipping of a corner, which my former invention enables, with all the incidental advantages due to such operation, and that it embodies and makes use of the same can-holder, made slightly larger than the can, and the same or any equivalent pattern of solder bath and furnace, and that it differs from the machine described in my former specification in the instrumentalities employed to occasion the rise and fall of the can-holders, the quarter-rotations of the can-holder, necessary to present the successive sides of the seams, and the eighth-rotation, necessary to enable the dipping of a corner. Thus, for instance, whereas in my former invention I have applied a can-holder support (within which the can-holder is fitted to revolve) connected with a sliding head actuated to a vertical rise and fall by means of a disk-cam, and a series of segmental gears connected with the disk-cam and adapted, through pinions and an intermediate shaft, to occasion the rotation of the can-holder through the connecting instrumentality of teeth formed on its periphery, I have in my present apparatus supported the can-holders and the holder-supports, which I arrange in series, upon rock-shaft arms suitably actuated to rise and fall not in an exact perpendicular direction, but in a slight arc, have employed pushing and pulling pawls independent of the rock-shaft arms supporting the can-holders to occasion the rotation of said can-holders, and have, moreover, dispensed altogether with the devices employed in my former machine for locking the can-holder in given positions.

My present apparatus, as stated, effectuates precisely the process enabled to be carried out by my former machine, and only differs from said machine in that its organization is such as to employ a series of can-holders as opposed to a single can-holder, which are adapted to rise and fall in corresponding opposite sets arranged on opposite sides of the machine; in that, as stated, the devices for effecting the rise and fall and rotation of each individual can-holder are mechanically different from those of my former machine, and in that a series of solder baths are employed.

My present apparatus is to be contradistinguished, equally with my former, from all former apparatus. Its objects are precisely the same as those of my former invention, and its chief merit over said invention lies in its mechanically distinct organization, which is such as to enable the soldering of a series of cans simultaneously.

A preferred embodiment of my invention is hereinafter described and claimed.

In the accompanying drawings, In Fig. 9 the trip-pawl is shown in its normal position of rest upon the lower surface of the boss of the shifter-standard. In Fig. 10 said pawl is represented as resting upon the upper surface of said boss in the position which it occupies when the standard has been advanced so as to trip said trip-pawl, but before the ascent of the can-holder which operates in connection with the set of pawls under consideration, and before the completion of the forward longitudinal movement of said standard; and in Fig. 11 the parts are represented in the position which they occupy when the shifter-standard has completed its advance, and when the bracket of the can-holder is, in the descent of the holder which follows the completion of the movement of the shifter-rod, rested upon the base-ledge of the shifter-standard in position to arrest the full descent of the can-holder and occasion only the dipping of the corner. In Fig. 16 the parts are represented in the position which they occupy immediately prior to the ascent of the can-holder and the descent of the pawls, the pushing-pawl being about to operate to the rotation of the holder in the direction of the arrow. In this figure is also represented a means of adjusting the length of the pawls by the employment of set-screws thereupon. Fig. 17 illustrates a position of the holder before its ascent is completed, before the pushing-pawl has completed its operation, and before the pulling-pawl has engaged with the pin $e''$. Fig. 18 illustrates a position of the can-holder during the period of a subsequent descent thereof, and while the pulling-pawl in its ascent is operating to rotate the holder in the direction of the arrow. Fig. 19 illustrates the position of the holder at the moment when the trip-pawl has been operated to encounter one of the pins, as illustrated in Fig. 8, and prior to that ascent of the holder and that descent of the pawls which occasions the operation of the trip-pawl for imparting an eighth-turn in reversal.

In the above diagrams the direction of movement of the pawls is indicated by the arrows applied directly to them, the direction of rotation of the can-holder illustrated by the arc-shaped arrow applied to it, and the ascent or descent of said holder indicated by the small straight arrow within its band.

Similar letters of reference indicate corresponding parts.

The following is a description of a preferred form of apparatus conveniently embodying my invention, four can-holders and solder-pans being represented.

A, A', and A'' are three vertical housings, preferably of the form represented, which are connected together by a series of longitudinal tie-rods, B, to form the frame-work of the apparatus. The housings A and A' are comparatively close together, while the housing A'' is remote some distance from A'.

C is a longitudinal rock-shaft supported free for oscillation in bearings D, erected centrally throughout the machine from, for instance, the central cross-frames, E, of the housings. This rock-shaft carries the rock-shaft arms F, Figs. 1, 2, 7, 8, and 12, the outer extremities of which are each equipped with a circular band constituting the can-holder support G.

Figure 1:
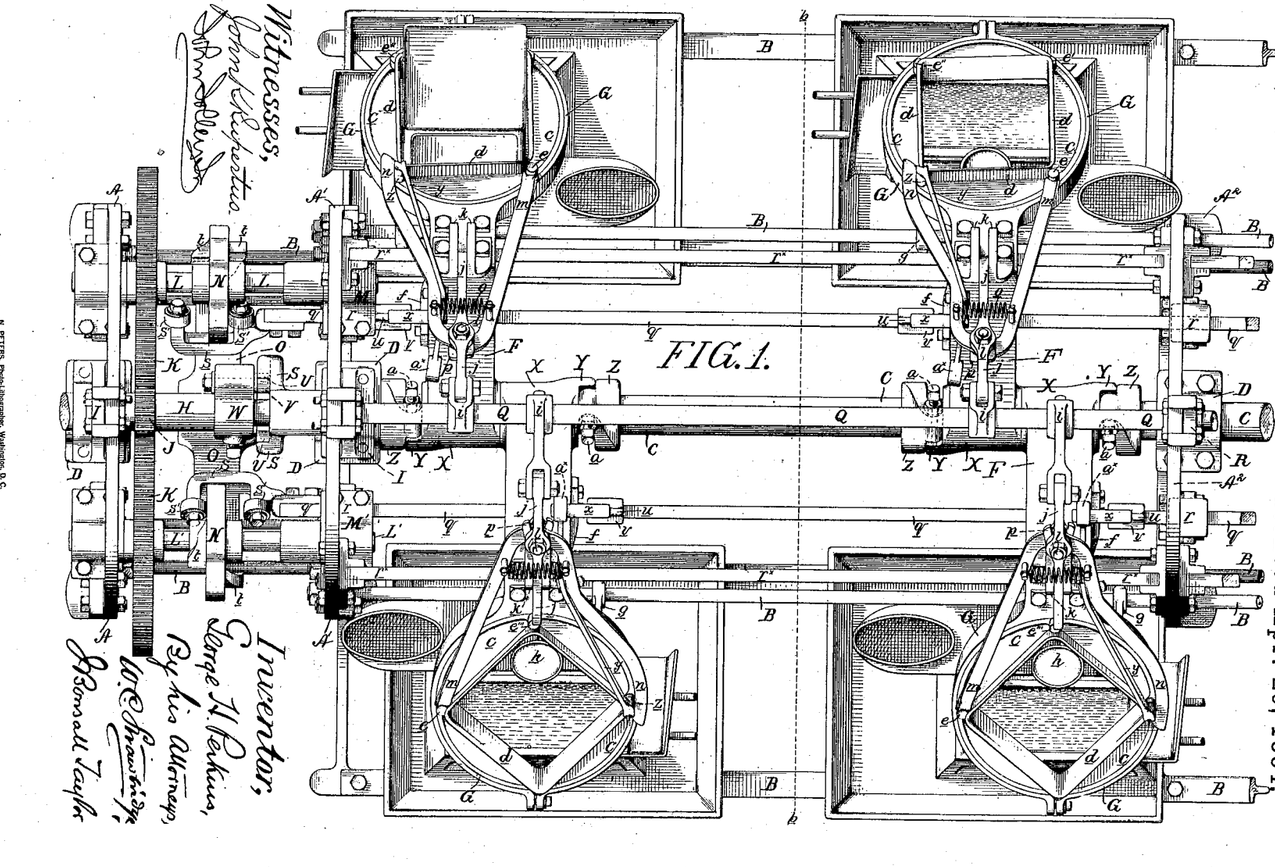
Figure 1 represents in top plan view an apparatus conveniently embodying my invention and represented as equipped with four can-holders, although the frame-work of the machine and the shafts can be extended to the right hand of the figure and any further number of can-holders applied. In this view the can-holders, which are squared with respect to the solder baths, are down in the position which they occupy with respect to said solder baths when one of the sides of the head-seams of each of the cans contained in them is being dipped, while the can-holders which are represented in an oblique position (which they occupy in the operation of dipping the corner) are up.
Figures 2, 3, 4, 5, 6:
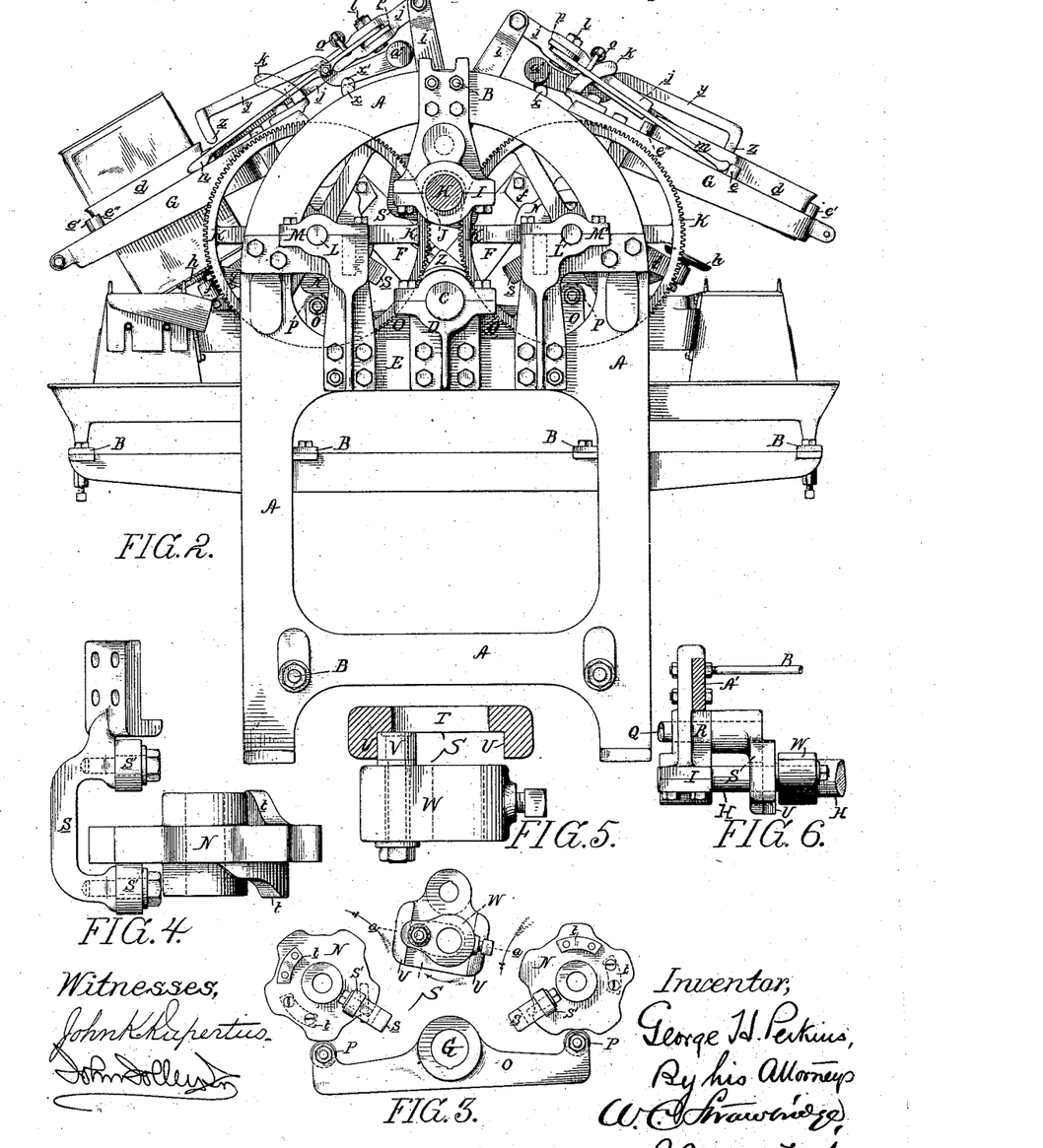
Fig. 2 is an end elevation of the apparatus of Fig. 1, viewed from the left-hand side of said figure, the parts being in the same position as in said Fig. 1.
Fig. 3 is a front elevation of the rocking yoke, the cams, the depending yoke, the crank, and the roller-yoke, all represented as being removed from the shafts which respectively carry them, but as occupying that relative position which they do occupy when in place in the machine.
Fig. 5 is a top plan view of the crank and depending yoke, the crank which actuates the said yoke being represented as horizontally sectioned on the line $a\ a$ of Fig. 3, and both parts being detached from the shafts which carry them.
Fig. 6 is a side elevation of the same parts, representing, however, a portion of the pawl-shaft with which the depending yoke is connected, and a portion of the driving-shaft which actuates the crank, together with one of the bearings for said shafts.
Figure 2:
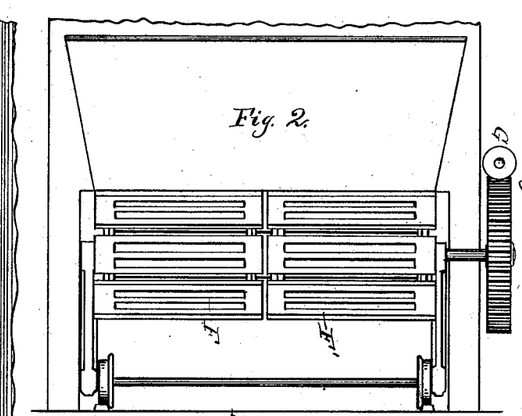
Figure 3:
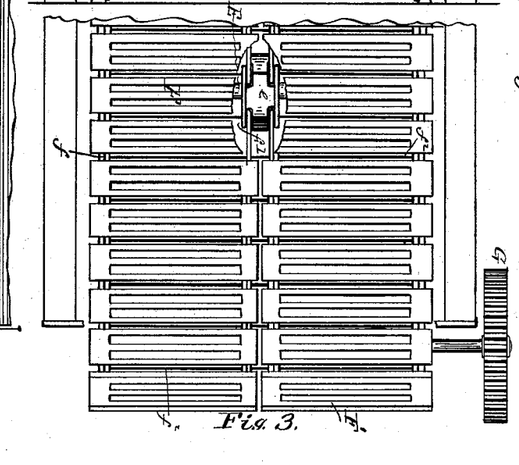
Figure 5:
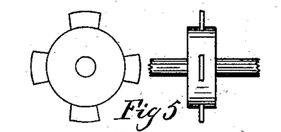
Figure 6:
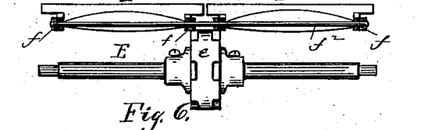

H is the driving-shaft of the machine, journaled in bearings I, fixed in the housings A and A'. This shaft is parallel with the rock-shaft and disposed in vertical alignment above the latter. Power is applied to that extremity of the driving-shaft which projects beyond the housing A. The driving-shaft is equipped with a driving-pinion, J, which engages with two driving toothed wheels, K, the circumference of each of which is five times greater than that of the pinion. These driving toothed wheels are keyed upon two cam-shafts, L and L', respectively journaled in bearings M and M' in the housings A A', in such manner as to be parallel with both the rock-shaft and the driving-shaft to either side thereof, as shown in Figs. 1 and 2. These cam-shafts are equipped with cams N, of substantially the outline represented in Fig. 3.

O is a rocking yoke keyed upon the rock-shaft so as to stand at right angles thereto and in line below the cams. Both extremities of this rocking yoke are equipped with friction-rollers P, which respectively encounter the peripheral faces of the cams, and the set of which rollers with respect to said yoke is that represented in Fig. 3.

From the foregoing description it will be understood that motion imparted to the driving-shaft is transmitted through the driving-pinion to both driving toothed wheels, and thereby to the cam-shafts and the cams, with the result that the revolution of the latter (in the same direction) occasions the oscillation of the rocking yoke—as the friction-rollers of the latter respectively ride upon the crests and hollows or depressions on the peripheral faces of the cams—and the consequent oscillation of the rock-shaft.

Q is what I term the "pawl-shaft," being a longitudinal rock-shaft suspended free for oscillation in bearings R, connected with the upper portion of the housings. It extends longitudinally throughout the machine, parallel with and in vertical alignment above the cam-shaft.

S is a depending yoke keyed upon the pawl-shaft at a point between the housings A and A'. It is clearly represented in Figs. 1, 3, 5, and 6, and is provided with a segmental slot, T, through which the driving-shaft passes, and with two ears or laterally-projecting operative surfaces, U, which encounter a friction-roller, V, carried by a crank, W, upon the driving-shaft, as represented in said Figs. 1, 3, 5, and 6. The rotation of the driving-shaft occasions the revolution of the crank W, and thereby, through the contact of the friction-roller of the crank with the ears of the depending yoke, occasions the vibration of the latter from side to side, and the consequent oscillation of the pawl-shaft. The pawl-shaft and rock-shaft oscillate synchronously in opposite directions.

Having now explained the means by which I actuate the rock-shaft and the pawl-shaft to their respective oscillations, it is proper to state that the extent of such oscillations *per se*, and the relation of movement of one shaft with the other, are due to and regulated by the relative proportions of the pinion and toothed wheels, of the cams on the cam-shaft, the rocking yoke, the depending yoke, and the crank on the driving-shaft, while the extent of their respective throws and the timing of the one with respect to the other are hereinafter fully explained.

The rock-shaft, to proceed with my description, is equipped with any desired number of rock-shaft arms, which carry each a can-holder. The rock-shaft arms are arranged alternately upon both sides of the rock-shaft, and are adapted to be lifted and dropped in two opposite series—first all those on one side, and then all those on the other—the drop causing the entrance of one side of one of the head-seams of all the cans contained in the holders on that side into their solder baths, and the lift occasioning the elevation of all the cans on the opposite side from out their solder baths, all the can-holders on one side being raised synchronously with the drop of all the can-holders on the other side. A series of separate solder baths corresponding in number to the can-holders is employed. The pawl-shaft is employed to operate a series of pawls or devices which occasion the rotation of the can-holders during the time when the sides of the seams of the cans contained therein are not immersed in their solder bath, these pawls being actuated, as hereinafter set forth, to occasion the rotation of that series of can-holders which are not in the position which they assume when the cans held by them are immersed.

F are the rock-shaft arms, a series of which, as stated, are connected with the rock-shaft. This connection is preferably not rigid, for a reason hereinafter set forth, and is made in the following manner: The lower extremity of the rock-shaft arm, speaking now in terms of one only, is formed with a tubular socket, X, which is shaped into a laterally-projecting lug, Y, Figs. 1, 7, 8, and 12.

Z is a collar keyed upon the rock-shaft, and provided with a laterally-projecting adjustable set-screw, $a$, which corresponds to or registers in opposite position with the lug Y on the tubular socket. This arrangement enables the lift of a given rock-shaft arm by its collar, through the encounter of set-screw and lug, to the extent of the throw of the shaft in the direction of such encounter, while it also permits the opposite collar, or that collar which is connected with that arm which is the opposite neighbor of the arm under consideration, to slightly recede from the lug on said last-named arm during the time when said arm is down to the extent to which it descends for the dipping of a corner, and during the time when the opposite arm is raised to its full extent.

Figures 12, 13:
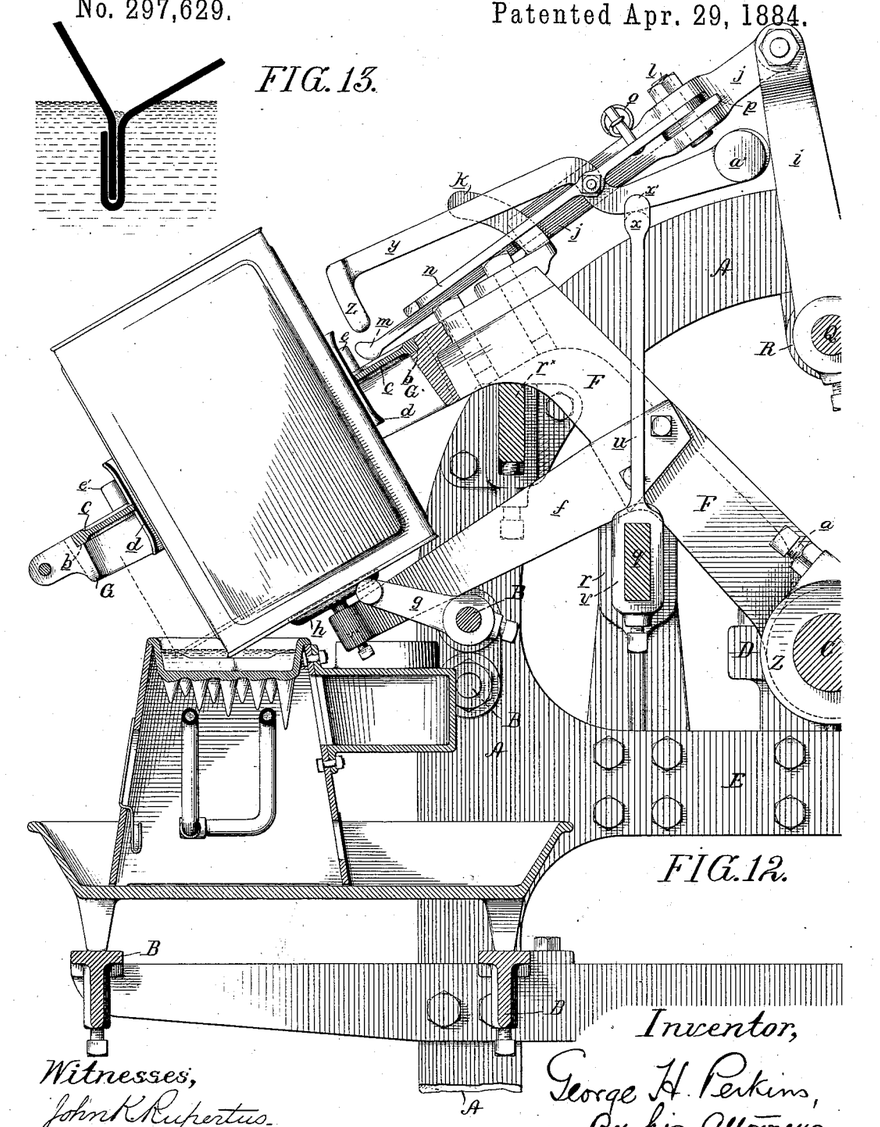
Fig. 12 is a partial end elevational and sectional detail illustrative of the position of one of the rock-shaft arms and can-holders at the time when said parts are down and one of the sides of a head-seam is being dipped, representing also the position of the pawls prior to the advance of the shifter-rod which trips the trip-pawl.
Fig. 13 is a sectional detail illustrative of the position of the seam of the can when immersed in the solder-bath, the seam being in a vertical position, the object of the vertical immersion being to avoid too great agitation of the solder in introducing and removing the seam.
Figures 14, 15, 16, 17, 18, 19:
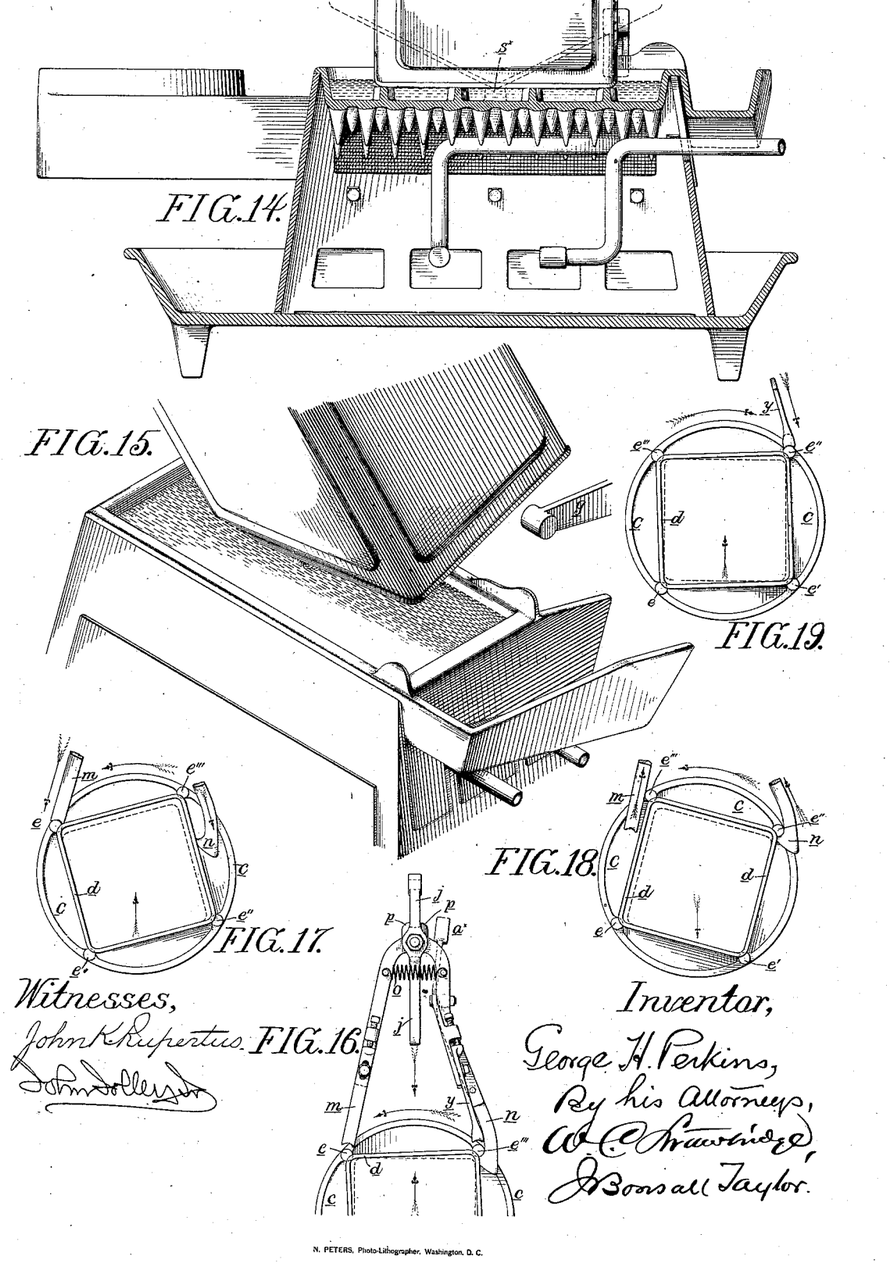
Fig. 14 is a front sectional elevation of such a solder-pan as I prefer to employ, it being of the character described by me in my former invention, and of substantially the character patented to me in and by Letters Patent No. 154,077, dated August 11, 1872. One of these solder-pans and furnaces is employed in connection with each can-holder, and they are supported from the frame-work of the machine in any convenient manner, but preferably in the manner represented in the drawings. Instead of a series of separate pans and furnaces it is of course competent for me to employ a single furnace and pan on each side of the machine, the proportions of the pan being such as to admit of the operation of all the holders on that side in connection with it.
Fig. 15 is a view in perspective of one of the solder-pans and a quadrangular can in the position which it is caused to assume with reference to the plane of the surface of said bath during the period of the lifting of the side of the seam just soldered from out the bath, as fully described in my former invention.
Figs. 16, 17, 18, and 19 are diagrams illustrative of several positions of the can-holder and its pawl-pins with respect to the pawls which operate it.

The outer extremities of the rock-shaft arms are, as heretofore stated, equipped with holder-supports G, the latter being circular bands of the character represented in Figs. 1, 2, 7, 8, and 12 of the drawings. These supports or bands are each provided with a circular recess, $b$, as shown in Fig. 12, and in these recesses are fitted to rotate the can-holders $c$, which latter are composed of a circular web, the perimeter of which is fitted to the circular recess in the holder, and in the center of which is an opening corresponding in sectional outline to the section of the can to be soldered, and bounded by a vertical band, $d$, of the same outline. This band is made larger than the can to be contained in it, as in the case of my former invention.

$e\ e'\ e''\ e'''$ are a series of pawl-pins vertically projected from the upper surface of the web of the can-holder, and placed in the construction of holder represented just beyond each corner of the band. They are designed to be acted upon by the pawls in a manner hereinafter explained.

By the above construction it will be clear that the holders are capable of rotation within their supports.

$f$ are brackets, one of which is connected with each of the rock-shaft arms, so as to project therefrom below the holder-support, the outer extremity of each of which is provided with a rotatable pad, $h$, upon which that head of the can the seams of which are in position to be dipped rests.

$g$ is a rest so connected with one of the tie-rods of the frame-work as to project below the lower head of the can, one of which rests is applied, if desired, in connection with each can-holder, to serve as a rest for the bottom of the can, and to such end co-operate with the ribs in the solder-pan. Each can-holder is controlled to rotate within its support by means of pawls, the construction and operation of which is as follows: (I now refer to one holder only and describe only such devices as actuate it. It is, however, to be understood that each holder is actuated by a set of pawls and pawl-actuating contrivances similar to those about to be described, and that the action of all the parts on one side is the same.)

$i$, Figs. 1, 2, 7, 8, and 12, is a pawl-rocker, being an arm keyed upon the pawl-shaft Q so as to project upwardly therefrom, as shown in the drawings. To the upper extremity of this pawl-rocker is pivoted a pawl-carrier, $j$, being an arm the outer extremity of which is sufficiently long in any position of the parts to rest within the guideway $k$, formed upon or connected with the rock-shaft arm and to be guided in its travel thereby.

To the pawl-carrier are pivoted, by a pin, $l$, vertical therewith, a pushing-pawl, $m$, and a pulling-pawl, $n$, Figs. 1, 2, 7, 8, 9, 10, 11, 12, 16, 17, and 18, which are laterally set with respect to said carrier, so as to project out on either side therefrom. They are prevented from approaching too closely together at their outer extremities, as they would under the influence of the action of the spiral spring $o$, which connects them together a short distance in advance of their pivot, by rearwardly-extending heels $p$, which are formed on them and encounter the sides of the pawl-carrier to the rear of the pivot.

The pushing and pulling pawls are designed to occasion a quarter-rotation of the can-holder, and operate to such result in the following manner: Assume the left-hand can-holder, Figs. 1, 2, 7, and 12, to be down and in position to dip one side of the head-seam of a can contained in it, and further assume that that can-holder and its pawls are in the position represented in Fig. 16. Upon the rise of the given can-holder—when it becomes necessary to rotate said can-holder so as to cause the immersion of the succeeding side of the seam upon its next descent—the left-hand pawl-rocker, which operates in connection with said holder, under the actuation of the pawl-shaft, is caused to descend, with the result that the pushing-pawl, encountering and pushing against the pin $e$, occasions the rotation of the can-holder in the manner and direction represented in Fig. 17 up to the time when the continued forward movement of the two pawls forces the pulling-pawl, traveling along and against the side of the band with which it is in contact under the influence of the spring O, to hook itself over the pin $e''$, immediately after which the pawl-rocker is timed to rise again and the rock-shaft arm and can-holder to descend, and thereby to occasion the completion of the quarter-turn of the can-holder by the pull of the pulling-pawl upon said pin $e''$ in the manner and direction represented in Fig. 18, such quarter-turn not being completed until the pushing-pawl, which has meanwhile been traveling backward against the side of the pin $e'''$, resumes its former normal position in front of the next pin, which, in the position of parts represented, is the pin $e'''$.

Figures 1, 4:
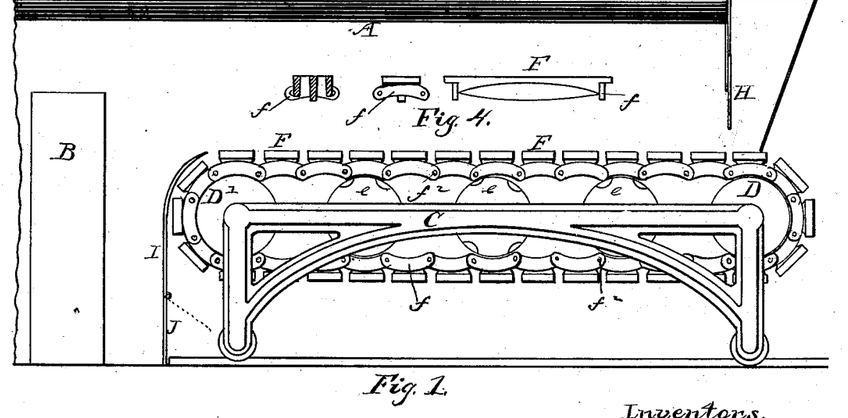
Fig. 4 is a top plan view of one of the cams detached from its shaft, and of that roller-yoke (detached from its shifter-rod) which operates in connection with the camways on the sides of said cam.
Figures 7, 8, 9, 10, 11:
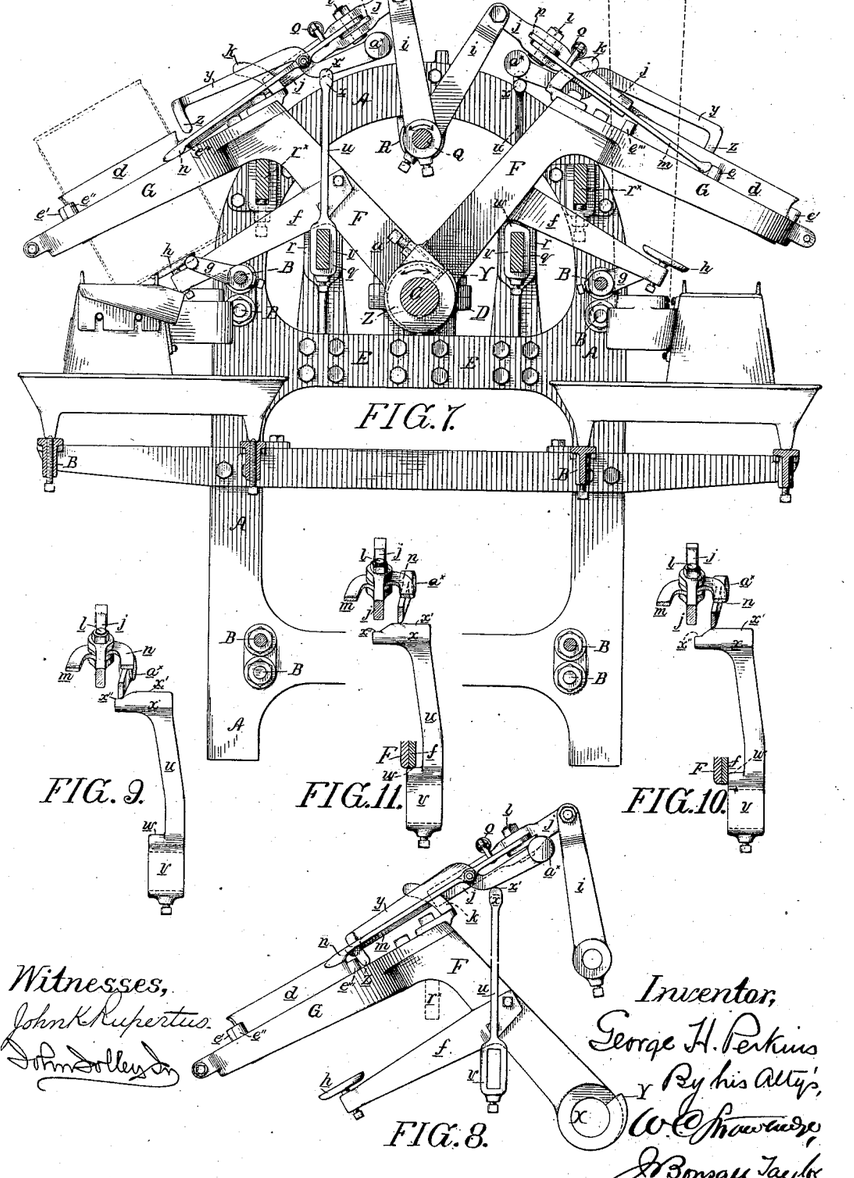
Fig. 7 is a vertical end sectional elevation of the apparatus of Fig. 1, viewed from the left-hand side of said Fig. 1, section being supposed on a vertical plane projected on the dotted line $b\ b$ of said Fig. 1, and the parts being in the same position as in said figure.
Fig. 8 is a side elevational view of one of the rock-shaft arms and its can-holder, the pawls which operate in connection therewith, one of the pawl-rockers, and one of the shifter-standards, the parts named being removed from the machine, but being represented in the position which they respectively occupy in the machine when said shifter-standard has been moved so as to trip said trip-pawl and set it for action, at the same time that it has thrown the pushing and pulling pawls out of action.
Figs. 9, 10, and 11 are front views of one of the shifter-standards, shown in connection with one of the pawl-carriers and portions of the pawls, all detached from the machine.

The above operation of the two pulling and pushing pawls is repeated for every full quarter-turn made, and until all four sides of the head-seam have been dipped. It is, however, desired in this apparatus, as well as in my former invention, to which reference has been made, to dip a corner of the can after dipping the four sides, and as it becomes necessary, in order to effect such dipping of the corner in the most effective way, to dip that corner which is intermediate between the two sides of the seam last dipped, I have devised the following contrivance for giving to the can-holder an eighth-turn in reversal:

$q$ is a shifter-rod, Figs. 1, 7, 12, horizontally journaled in slide-bearings $r$ in the frame-work. There are two of these rods—one employed in connection with each series of holders. The shifter-rods will be seen to project beyond their bearings in the housings A′, and to be equipped, as to their projecting extremities, with what I term a "roller-yoke," $s$, Figs. 1, 3, and 4, being a metal yoke well made when of the form represented in the drawings and equipped with two friction-rollers, $s'$. Each one of these yokes is so set in the machine as to embrace one of the cams on the cam-shaft. The sides of the cams are equipped with cam-ways $t$, designed, in the rotation of the cams, to alternately encounter the friction-rollers $s'$ on the roller-yoke, and thereby to occasion the longitudinal reciprocation of the shifter-rods end for end within the frame-work. These camways are of such inclination and so respectively set upon the cams as to occasion the opposite reciprocation of the two shifter-rods, as shown in Fig. 1, and to time such reciprocation to predetermined calculated intervals, there being a dwell in the middle of the throw of the rods.

$u$ are shifter-standards, Figs. 1, 7, 8, 9, 10, 11, and 12, fixedly connected with the shifter-rods and vertically erected therefrom. One of these standards is employed in connection with each of the rock-shaft arms and the set of and relative arrangement of the component parts described, as a skillful mechanic could without doubt make many changes in detail of both construction and arrangement without departing from the invention properly as such. I myself, for instance, contemplate the employment of an apparatus practically of the same organization as this, but in which there is but a single series of can-holders and holder-actuating devices, all disposed upon the same side of the shaft. I also contemplate actuating the can-holders when arranged all upon one side as above described, in separate series—every alternate can rising at the time that its neighbor descends—or a series of neighboring holders rising while another series near at hand descends. While, moreover, it is competent for me with this machine to introduce the sides of the seams into the bath and to withdraw them therefrom at an angle or at given angles, it is also possible to effect the accurate soldering of the can when the holders are operated square with the solder-pans, and not slightly oblique, and when the cans are simply given four quarter-turns and dipped with the sides of their seams parallel with the plane of the surface of the solder, a corner not being dipped. Instead, also, of dipping the corner which is intermediate between the two sides last dipped, the pawls can be arranged so as to turn the holder to dip the corner last reached, or that corner which is next beyond that which I have described as being dipped; but all these possibilities of operation are not such as tend to the most desirable method, as the best results with this machine, equally with my first, are attained and the minimum of solder consumed by withdrawing the several sides of the seam in precisely the manner of my first apparatus, and in then reversing the holder by the trip-pawl an eighth-turn and dipping the corner next to that last reached.

In the accompanying claims I have in many instances used the plural in speaking of the can-holders, their rock-shaft arms, pawls, and various actuating devices. It is, however, to be understood that I can at will organize this machine in such manner that, for instance, but one can-holder and one set of holder-actuating instrumentalities may be employed, and that my use of the plural does not forbid such arrangement, but is for simplicity of expression merely. I have also in many instances used the singular and claimed but a single set of appliances, although this set may be many times reproduced with a machine embodying a series of holders, &c., and arranged as represented in these drawings.

Before stating those features of invention upon which I lay claim, it is proper for me to mention that I am aware that in United States Letters Patent No. 242,631 there is represented and described a soldering-machine in which a series of revoluble can-holders are supported upon and carried by tilting or pivoted can-carriers mounted upon and carried by carriages controlled to travel on an endless track. The said machine, however, differs and is to be contradistinguished from mine not only in its entire construction and operation, as a mere comparison will verify, but also in these two vital characteristics—to wit, that both the tilting of its can-carriers and the revolution of its can-holders are dependent upon the longitudinal travel or advance of its carriages upon the endless track, while in my machine the can-holders are stationary in respect to longitudinal and transverse movement. It is proper for me to add that the word "stationary," as employed in the claims, is to be understood with the above qualification.

Having thus described my invention, I claim and desire to secure by Letters Patent—

1. In a machine for soldering the seams which secure the heads to the bodies of quadrangular, square, hexagonal, or other shaped sheet-metal cans not circular or oval, the following instrumentalities in combination: first, a series of stationary rotatable can-holders each adapted to receive a can; second, a series of rock-shaft arms to which said can-holders are connected so as to rock therewith; third, mechanism common to all of the rock-shaft arms whereby said rock-shaft arms are at predetermined intervals caused to rock; fourth, mechanism whereby the can-holders are at predetermined intervals caused to turn or rotate; and, fifth, pans or suitable devices adapted to contain solder.

2. In a machine for soldering the seams which secure the heads to the bodies of quadrangular, square, hexagonal, or other shaped sheet-metal cans not circular or oval, the following instrumentalities in combination: first, a double series of rotatable can-holders each adapted to receive a can; second, a double series of rock-shaft arms to which said can-holders are respectively connected so as to rock therewith; third, mechanism common to both series of rock-shaft arms whereby first one series of said arms and then the other series is at predetermined intervals caused to rock; fourth, mechanism whereby first one series of can-holders and then the other series is at predetermined intervals caused to turn or rotate; and, fifth, pans or suitable devices to contain solder.

3. In a machine for soldering the seams which secure the heads to the bodies of quadrangular, square, hexagonal, or other shaped sheet-metal cans not circular or oval, the following instrumentalities in combination: first, a series of stationary rotatable can-holders each adapted to receive a can; second, a series of rock-shaft arms to which said can-holders are connected so as to rise and fall therewith; third, mechanism whereby the rock-shaft arms are at predetermined intervals caused to rock; fourth, mechanism whereby the can-holders during their rise are caused to make a part of a quarter-turn, and during their fall to complete said quarter-turn; and, fifth, pans or suitable devices adapted to contain solder.

4. In a machine for soldering the seams which secure the heads to the bodies of quadrangular, square, hexagonal, or other shaped sheet-metal cans not circular or oval, the following instrumentalities in combination: first, a series of rotatable can-holders adapted each to receive a can; second, a series of rock-shaft arms to which said can-holders are connected so as to rise and fall therewith; third, mechanism whereby the rock-shaft arms are at predetermined intervals caused to rock to their full throw up and down; fourth, mechanism whereby the rock-shaft arms are at predetermined intervals arrested in descending before they have completed their full descent, and retained in such position until they again rise; and, fifth, pans or suitable devices to contain solder.

5. In a machine for soldering the seams which secure the heads to the bodies of quadrangular, square, hexagonal, or other shaped sheet-metal cans not circular or oval, the following instrumentalities in combination: first, a series of rotatable can-holders adapted each to receive a can; second, a series of rock-shaft arms to which said can-holders are connected so as to rise and fall therewith; third, mechanism whereby the rock-shaft arms are at predetermined intervals caused to ascend to the full height and descend to the full extent of the movement of the rock-shaft arms; fourth, mechanism whereby the rock-shaft arms are at predetermined intervals arrested in their full descent, and retained in their arrested position until their next ascent; fifth, mechanism whereby the can-holders are caused to intermittently rotate, so as to present the four sides of one of the head-seams of the cans contained in them and one of the corners to a bath of solder; and, sixth, pans or suitable devices adapted to contain solder.

6. In a machine for soldering the seams which secure the heads to the bodies of quadrangular, square, hexagonal, or other shaped sheet-metal cans not circular or oval, the following instrumentalities in combination: first, pans or suitable receptacles or devices adapted to contain molten solder; second, a double series of rotatable can-holders adapted to receive each a can; third, a double series of rock-shaft arms to which said can-holders are connected so that they rise and fall therewith; fourth, mechanism whereby the rock-shaft arms are at predetermined intervals caused to ascend and descend; and, fifth, suitable devices whereby given rock-shaft arms are at predetermined intervals raised to a height greater than is correspondent with the descent of the remaining arms.

7. In a machine for soldering the seams which secure the heads to the bodies of quadrangular, square, hexagonal, or other shaped sheet-metal cans not circular or oval, the following instrumentalities in combination: a series of can-holders, a series of holder-supports, a series of rock-shaft arms, a series of pawls, a pawl-shaft and pawl-carrying attachments, a rock-shaft, and suitable mechanism for actuating the rock-shaft and the pawl-shaft, substantially as hereinbefore set forth.

8. In a machine of the class above recited, in combination with a series of revoluble can-holders provided with pawl-pins, a series of pushing and pulling pawls, and means for actuating said pawls so as to occasion quarter-turns of the can-holders, substantially as set forth.

9. In a machine of the class above recited, in combination with a series of revoluble can-holders provided with pawl-pins, a series of trip-pawls and means for occasioning the intermittent actuation of said trip-pawls, for the purpose of giving an eighth-turn to the can-holders, substantially as and for the purpose set forth.

10. In a machine of the class above recited, as a composite device for occasioning the rotation of a can-holder, a pushing-pawl, a pulling-pawl, a trip-pawl, and means for actuating said pawls, substantially as hereinbefore set forth.

11. In a machine of the class above recited, in combination with a revoluble can-holder provided with pawl-pins and connected with a rock-shaft arm so as to rise and fall therewith, a pushing and a pulling pawl connected together by a spring, and ordinarily in range of contact with the pawl-pins, and a trip-pawl pivoted to said pulling-pawl, suitably actuated to rise and fall oppositely to the rock-shaft, and ordinarily retained out of contact with the pawl-pins on the can-holder, and means for tripping said trip-pawl into action with said pins, so as to raise the pushing and pulling pawls out of range of contact therewith, substantially as set forth.

12. As a device for actuating the pushing and pulling pawls and the trip-pawl, the pawl-carrier, the pawl-rocker, the shifter-standard, means for actuating said shifter-standard, and means for oscillating the pawl-shaft, substantially as set forth.

13. As a device for tripping the trip-pawl, the shifter-standard provided with a cam-surface, and means for actuating said shifter-standard, so that its cam-surface operates upon said trip-pawl, substantially as set forth.

14. In a machine of the class above recited, in combination with a pulling-pawl, a trip-pawl provided with a counter-balance, substantially as set forth.

15. In a machine of the class above recited, as a device for intermittently arresting the descent of the rock-shaft arms, the shifter-standards provided with the base-bands and erected from the shifter-rod, the shifter-rod, and means for imparting to the shifter-rod a predetermined intermittent longitudinal reciprocation, substantially as set forth.

16. In a machine of the class above recited, as a means for connecting the rock-shaft arms with the rock-shaft in such manner as to permit for a given arm a lift greater than the descent of a given arrested arm, the laterally-projecting lugs on the rock-shaft arm, and the collars on the rock-shaft, substantially as set forth.

17. In a machine of the class above recited, in combination with the trip-pawls and with the rock-shaft arms, the shifter-standards, formed each with a base-band or laterally-projecting stop, and provided with a boss having an upper surface, a lower surface, and an intermediate incline, the shifter-rod, and means for actuating said shifter-rod longitudinally, so as at predetermined intervals to place the base-bands in the path of the descending rock-shaft arms, and to force the trip-pawls to travel up the inclined surface on the bosses, substantially as and for the purposes hereinbefore recited.

18. In a machine of the class above recited, in combination with and as a device for occasioning the oscillation of the rock-shaft, rock-shaft arms, and can-holder, the rocking yoke on the rock-shaft, the cams on the cam-shafts, and means for actuating said cams, substantially as hereinbefore set forth.

19. In a machine of the class above recited, in combination with the can-holders, the pawls, and the pawl-shaft, the depending yoke on said pawl-shaft, the crank on the driving-shaft, the driving-shaft, and means for actuating said shaft, substantially as and for the purposes set forth.

20. In a machine of the class above recited, in combination with the can-holders, and the set of pawls which actuate said holders, the shifter-rods and their shifter-standards, the roller-yoke, the cams, and suitable mechanism for actuating said cams, substantially as and for the purposes set forth.

21. In a machine of the class above recited, a series of rotatable can-holders, a series of rock-shaft arms supporting the same, a rock-shaft for actuating said rock-shaft arms, a set of pawls for occasioning the rotations of said holders, pawl-rockers, and pawl-carrying devices for actuating said pawls, a pawl-shaft, and suitable mechanism for occasioning the opposite oscillations of the rock-shaft and of the pawl-shaft, substantially as hereinbefore set forth.

22. In a machine of the class above recited, in combination with the rock-shaft, rock-shaft arms, and can-holder, and with the pawl-shaft, pawl-rockers, and pawls, the driving-shaft, driving-pinion, driving toothed wheels, cam-shafts, cams, rocking yoke, depending yoke, and crank, the whole assembled, related, and operating substantially as and for the purposes specified.

23. In a machine of the class above recited, in combination with a can-holder, a pawl-carrier, a pushing and a pulling pawl, a spiral spring connecting said pawls, heels on the rearwardly-extending extremities of said pawls, and a counterbalanced trip-pawl pivoted to the pushing-pawl, substantially as and for the purposes set forth.

24. In a machine of the class above recited, in combination with a rock-shaft arm, a can-holder connected with and carried by said arm, a pawl-carrier provided with pawls to actuate said can-holder, and a guide for said pawl-carrier, substantially as and for the purposes set forth.

25. In a machine of the class above recited, in combination with cams having crests and hollows upon their peripheral faces and cam-surfaces upon their sides, roller-yokes operating in connection with the cam-surfaces on their sides, and a rocking yoke operating in connection with the crests and hollows upon their faces, a rock-shaft equipped with can-holders and adapted to be actuated by said rocking yoke, devices for actuating the can-holders, and shifter-standards for controlling the can-holder-actuating devices adapted to be actuated by said roller-yokes, substantially as and for the purposes set forth.

26. In a machine of the class above recited, in combination with a can-holder, being a rotatable disk or plate of metal provided with a central opening, pawl-pins, substantially as and for the purposes specified.

27. In a machine of the class above recited, in combination with a solder-pan provided with a central stop adapted to receive the corner of an angular can, a correspondingly angular can-holder adapted to receive a can, means for rocking said can-holder up and down with respect to said solder-pan, and means for presenting said can-holder angularly with respect to the plane of the surface of solder in said pan, so that upon a descent of the can-holder in its angular position a corner of the can will encounter and rest upon the stop, substantially as and for the purposes set forth.

In testimony whereof I have hereunto signed my name this 25th day of January, A. D. 1883.

GEORGE H. PERKINS.

In presence of—
   J. BONSALL TAYLOR,
   WALTER S. GIBSON.